United States Patent
Lockwood et al.

(10) Patent No.: US 10,845,939 B2
(45) Date of Patent: *Nov. 24, 2020

(54) METHOD AND SYSTEM FOR DETERMINING USER INTERFACE USAGE

(71) Applicant: Pegasystems Inc., Cambridge, MA (US)

(72) Inventors: Damon Lockwood, Decatur, GA (US); Karin Lim Poorts, San Jose, CA (US); Thomas Rieck, Marietta, GA (US); Glen Sprague, San Jose, CA (US); Jeremy Wetherford, Gainesville, GA (US)

(73) Assignee: Pegasystems Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/409,491

(22) Filed: May 10, 2019

(65) Prior Publication Data

US 2020/0004385 A1    Jan. 2, 2020

Related U.S. Application Data

(63) Continuation of application No. 15/278,499, filed on Sep. 28, 2016, now Pat. No. 10,289,262.

(Continued)

(51) Int. Cl.
*G06F 3/0481* (2013.01)
*G06F 11/34* (2006.01)
(Continued)

(52) U.S. Cl.
CPC ........ *G06F 3/0481* (2013.01); *G06F 11/3419* (2013.01); *G06F 11/3438* (2013.01);
(Continued)

(58) Field of Classification Search
CPC .............. G06F 3/0481; G06F 17/2705; G06F 17/2247; G06F 11/3419; G06F 11/3438; G06F 40/14; G06F 40/205
See application file for complete search history.

(56) References Cited

U.S. PATENT DOCUMENTS 5,696,702 A    12/1997  Skinner
7,032,229 B1 *  4/2006  Flores ................. G06F 11/3419
                                                    709/224

(Continued)

FOREIGN PATENT DOCUMENTS

WO         2016186833 A1    11/2016

OTHER PUBLICATIONS

Brett Owens: "Time Recording Software Demo: Chrometa 5.0", Youtube. Sep 1, 2016 (Sep. 1, 2016), Retrieved from the Internet: URL:https://www.youtube.com/watch?v=oNEGNR5co-A, substitute for unavailable item Brett Owens: "Flow Automatic Time Tracking Software Works: Chrometa Demo". Youtube. Mar. 31, 2015 (Mar. 31, 2015). XP054977180. Retrieved from the Internet: URL:https://www.youtube.com/watch?v=Q56i803h9IU.

(Continued)

*Primary Examiner* — William L Bashore
*Assistant Examiner* — Gregory A Distefano
(74) *Attorney, Agent, or Firm* — Smith, Gambrell & Russell, LLP (57) ABSTRACT

For example, in an embodiment, a method of determining user interface usage may comprise collecting, from a user interface including at least one data entry field, data indicating at least one event that occurs as a result of an action performed by a user on a data entry field and data associated with the user interface at the time of the at least one action, extracting, from the data indicating at least one event and the data associated with the user interface, data indicating an (Continued)

entity associated with the at least one event, applying an interval to the data indicating at least one event, the data associated with the user interface, and the data indicating an entity and determining an entity as owner of the event for that interval, and determining a duration of an activity based on a number of intervals that contain a given entity and action.

17 Claims, 5 Drawing Sheets

Related U.S. Application Data (60) Provisional application No. 62/234,282, filed on Sep. 29, 2015.

(51) Int. Cl.
*G06F 40/14* (2020.01)
*G06F 40/205* (2020.01)

(52) U.S. Cl.
CPC ............ *G06F 40/14* (2020.01); *G06F 40/205* (2020.01); *G06F 2201/86* (2013.01)

(56) References Cited

U.S. PATENT DOCUMENTS

| | | |
|---|---|---|
| 7,222,293 B1 | 5/2007 | Zapiec |
| 8,886,788 B2 * | 11/2014 | Tung ...................... H04L 43/16 709/224 |
| 2002/0069031 A1 | 6/2002 | Lehman |
| 2002/0129346 A1 | 9/2002 | Lee |
| 2007/0261030 A1 * | 11/2007 | Wadhwa ............. G06F 11/3438 717/127 |
| 2011/0038542 A1 | 2/2011 | Barkan |

OTHER PUBLICATIONS

Extended European Search Report, dated Mar. 24, 2017, issued in corresponding European Application No. 16191549.1.

Response to Extended European Search Report dated Mar. 24, 2017, submitted Oct. 25, 2017 in corresponding European Application No. 16191549.1.

European Examination Report, dated Aug. 22, 2019, issued in corresponding European Application No. 16191549.1.

Response to European Examination Report dated Aug. 22, 2019, submitted Feb. 24, 2020 in corresponding European Application No. 16191549.1.

European Examination Report, dated Jun. 23, 2020, issued in corresponding European Application No. 16191549.1.

Response to European Examination Report dated Jun. 23, 2019, submitted Sep. 14, 2020 in corresponding European Application No. 16191549.1.

* cited by examiner

204
Collector

206
Extractor

208
Usage Determiner

Fig. 4

METHOD AND SYSTEM FOR DETERMINING USER INTERFACE USAGE

CROSS-REFERENCE TO RELATED APPLICATIONS

This application claims the benefit of U.S. Provisional Application No. 62/234,282, filed Sep. 29, 2015, the contents of which are incorporated herein in their entirety.

BACKGROUND OF THE INVENTION

1. Field of the Invention

The present invention relates to methods and systems for determining user interface usage, and in particular detecting and measuring the duration of activities or processes performed in one or more user interfaces.

2. Description of the Related Art

Conventional approaches to detecting an activity or process in a user interface rely on first describing and then recognizing a user workflow. For example, a workflow may consist of a series of steps a user performs. However, there are drawbacks to using a workflow to detect processes and activities. For example, there may be multiple ways to perform the same activity, which makes it difficult to capture all the different ways to perform the activity. There may be multiple applications where the user can perform the same activity, which makes it difficult to detect all but the simplest activities because the number of possible workflows becomes too large to describe. Likewise, in a desktop environment, users can multitask, effectively intertwining multiple workflows into a single sequence that must then be disambiguated to detect single activities.

As a result, a need arises for improved techniques for detecting and measuring the duration of activities or processes performed in one or more user interfaces.

SUMMARY OF THE INVENTION

Embodiments of the present invention may provide improved techniques for detecting and measuring the duration of activities or processes performed in one or more user interfaces.

For example, in an embodiment, a method of determining user interface usage may comprise collecting, from at least one user interface including at least one data entry field, data indicating at least one event that occurs as a result of an action performed by a user on a data entry field and data associated with the user interface at the time of the at least one action, extracting, from the data indicating at least one event and the data associated with the user interface, data indicating an entity associated with the at least one event, applying an interval to the data indicating at least one event, the data associated with the user interface, and the data indicating an entity and determining an entity as owner of the event for that interval; and determining a duration of an activity based on a number of intervals that contain a given entity and action.

In an embodiment, the collecting may comprise converting the data associated with the user interface at the time of the at least one action to a text representation. The converting may comprise at least one process selected from a group comprising: parsing hypertext markup language (HTML) in a web page, iterating over individual controls in a user interface, iterating over each detected text region in a screen that was captured with optical character recognition (OCR), and iterating over characters within at least one of a mainframe screen and a console screen. The converting may comprise including text bounded within a logical control and ignoring extraneous information. The extracting may comprise applying at least one of a plurality of text-processing rules and a plurality of object selection rules to the data indicating at least one event and the data associated with the user interface. The text-processing rules may comprise at least one rule selected from a group comprising: identifying a label and capturing text after the label, matching patterns using at least one of regular expressions and other pattern matching, matching keywords, and identifying a list of specific keywords. The method may further comprise reinforcing an entity by detecting other occurrences of the entity in at least one of other screens, files, documents, emails, comments, and fields. The method may further comprise detecting an activity using hierarchical clustering. The method may further comprise determining multitasking by identifying time intervals that alternate between different entity and action winners and by determining a time interval winner based on the most common entity in the time interval. The method may further comprise determining an entity as owner of an event for an interval that includes at least one of no entities and no actions based on an entity determined as owner of surrounding intervals.

For example, in an embodiment, a system for determining user interface usage may comprise a processor, memory accessible by the processor, and program instructions and data stored in the memory, the program instructions executable by the processor to perform collecting, from a user interface including at least one data entry field, data indicating at least one event that occurs as a result of an action performed by a user on a data entry field and data associated with the user interface at the time of the at least one action, extracting, from the data indicating at least one event and the data associated with the user interface, data indicating an entity associated with the at least one event, applying an interval to the data indicating at least one event, the data associated with the user interface, and the data indicating an entity and determining an entity as owner of the event for that interval, and determining a duration of an activity based on a number of intervals that contain a given entity and action.

For example, in an embodiment, a computer program product for determining user interface usage may comprise a non-transitory computer readable medium storing program instructions that when executed by a processor perform collecting, from a user interface including at least one data entry field, data indicating at least one event that occurs as a result of an action performed by a user on a data entry field and data associated with the user interface at the time of the at least one action, extracting, from the data indicating at least one event and the data associated with the user interface, data indicating an entity associated with the at least one event, applying an interval to the data indicating at least one event, the data associated with the user interface, and the data indicating an entity and determining an entity as owner of the event for that interval, and determining a duration of an activity based on a number of intervals that contain a given entity and action.

DETAILED DESCRIPTION OF THE INVENTION

Embodiments of the present invention provide improved techniques for detecting and measuring the duration of activities or processes performed in one or more user interfaces (UIs). For example, embodiments of the present UI usage systems and methods may provide an activity or process as an action performed on an entity rather than a workflow. For example, an address change is the act of changing an address. Other non-limiting examples may include claims adjustments, change orders, and fee refunds. Rather than detecting a workflow, embodiments of the present UI usage systems and methods may detect that the user is operating on an entity (such as a customer and address) and the action performed on the entity (such as a change).

Figure 1:
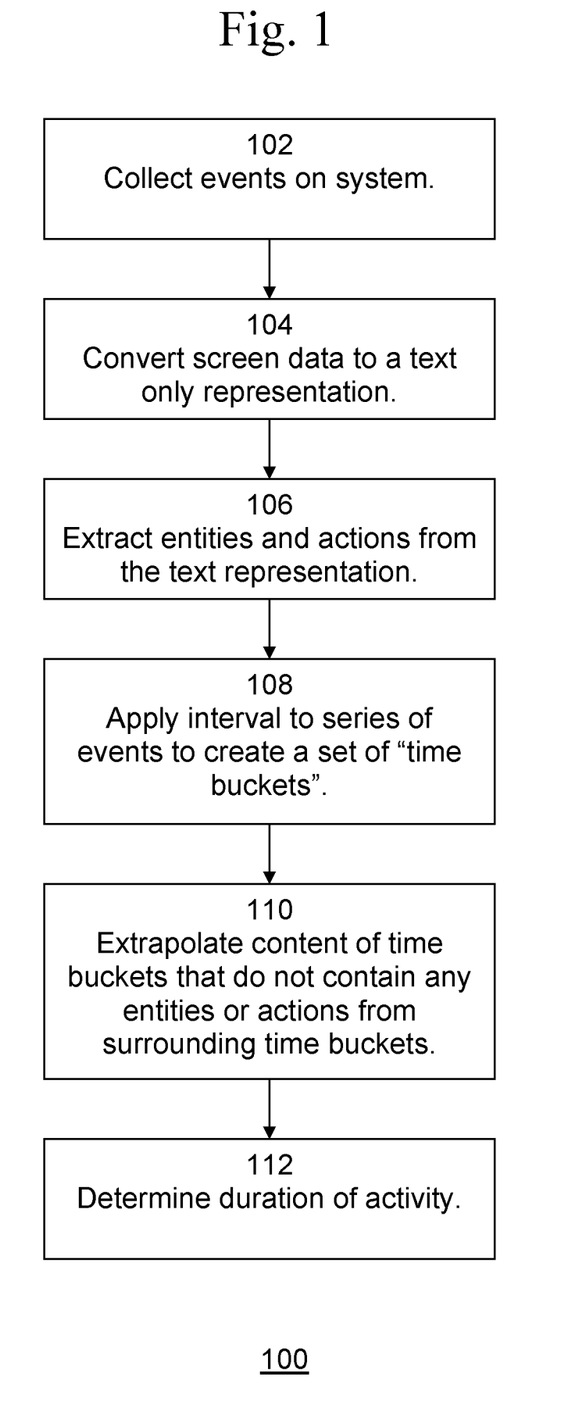
FIG. 1 is an exemplary flow diagram of one embodiment of a process for detecting and measuring the duration of activities or processes performed in one or more user interfaces.

A flow diagram of one embodiment of a process of the present invention is shown in FIG. 1. This example shows a process 100 for detecting and measuring the duration of activities or processes performed in one or more user interfaces. It is best viewed in conjunction with FIG. 2, which shows an example of an embodiment of structural elements that may perform process 100. User interface 202 may be displayed to a user of a computer system and includes a number of data entry fields. The user may select one or more of the data entry fields, sequentially or non-sequentially, and may enter data into the field in the form of text, checkbox selection, list entry selection, etc.

Figure 2:
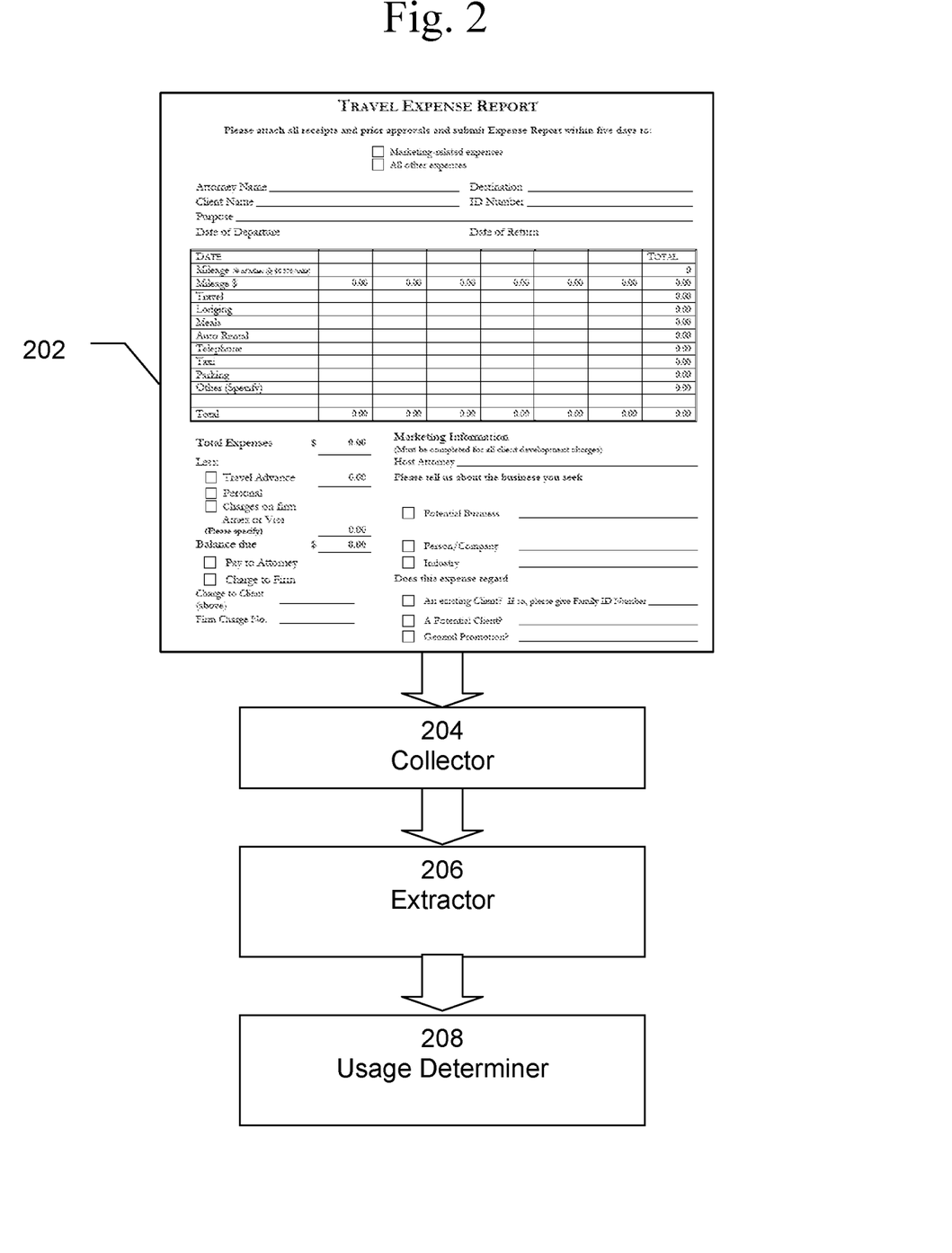
FIG. 2 is an exemplary diagram of an embodiment of structural elements that may perform the process shown in FIG. 1.

Referring to FIG. 1, Process 100 begins with step 102, in which a collector 204 on the computer system, or on a remote computer system, may collect data indicating an action performed by a user on a data entry field and data associated with the user interface at the time of the action. Collector 204 may generate from the actions and data a series of events that may contain both an individual event (such as a click, double-click, text-change, etc.) and the data on the screen at the time of that event. In step 104, the data on the screen may be converted into a text representation. In this way, context of an event may be captured and converted to text for extracting relevant terms.

When converting a screen to text, it may not be sufficient to simply create a set of words separated by spaces. Doing so would lose important information, such as which words were part of a label or if a field was blank (in which case a blank phrase should be emitted). To correctly create phrases, the system may iterate the contents of the screen in its native format. For example, to create phrases from a web page, the system may parse hypertext markup language (HTML) in the web page. To create phrases from a desktop application such as an application executing on a Windows®, macOS, OS/2®, UNIX® or Linux operating system, the system may iterate over the individual controls in the application or user interface. To create phrases from a screen that was captured with optical character recognition (OCR), the system may iterate over detected text regions. To create phrases from a mainframe or console screen, the system may iterate over every character on the screen, grouping characters together into a phrase until a sequence of more than one blank character is encountered, at which point a new phrase may be started. In each example, the system may include text bounded within a logical control, such as a label or textbox, but may ignore extraneous information. For example, some embodiments of the system may ignore formatting such as italics, bold, underlining and line breaks. Other embodiments of the system may use the formatting to identify text or phrases. In this way, the system may create a common phrase format that retains the logical layout of the application, while ignoring formatting and application differences.

In step 106, entities and actions may be extracted by Extractor 206 from the text representation. In order to extract entities, the underlying user interface may generate the text representation by converting the underlying user interface into an abstract representation, such as a document object model representation (DOM). Based on the text representation, entities may then be extracted utilizing text processing rules, object selection rules, or both.

For example, these rules may be basic patterns that detect a field by the label next to it. The extracted entities and actions may be stored or annotated along-side the events, for example as attributes or metadata of the events. Examples of fields that may be detected may include Name, Address, Phone Number, Credit Card Number, Social Security Number, Bank Account Number, etc. The present UI usage systems and methods are not limited to these examples, rather the present UI usage systems and methods may be applied to any type of text representation, field, or text-processing rule.

Figure 3:
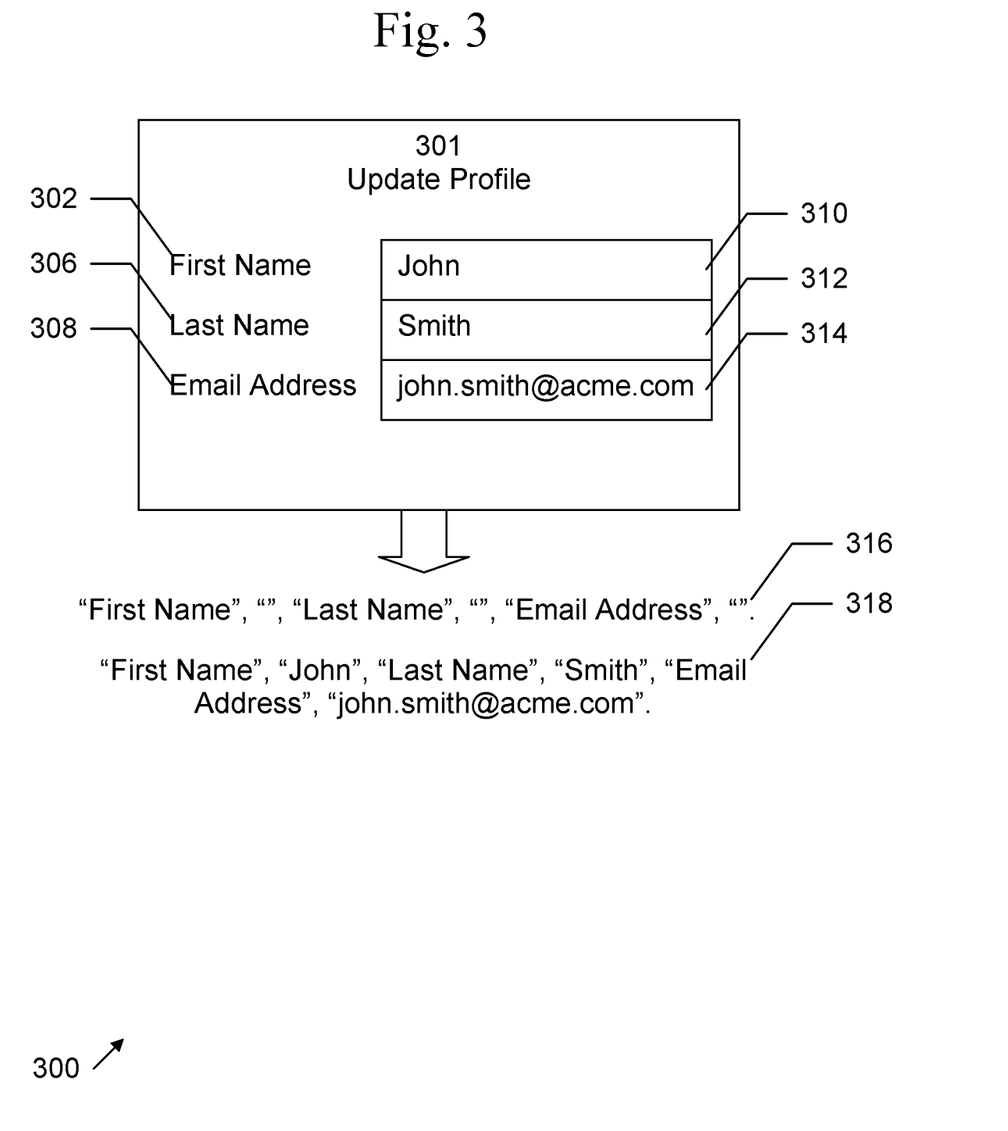
FIG. 3 is an exemplary diagram of an embodiment of a user interface, which may be displayed to a user of a computer system.

Another example of a user interface 300, which may be displayed to a user of a computer system and includes a number of data entry fields, is shown in FIG. 3. For a non-limiting example of text-processing rules, consider a typical web form, for example, Update Profile web form 301. In this example, form 301 may contain the labels First Name 302, Last Name 306, and Email Address 308. Each label may be followed by a text entry box, such as boxes 310, 312, 314. When form 301 is converted to text, a series of phrases may be generated with the contents of the labels and the textboxes. If the text boxes are blank, the following phrases 316 may, for example, be generated: "First Name", " ", "Last Name", " ", "Email Address", " ". If the textboxes are not blank, the following phrases 318 may, for example, be generated: "First Name", "John", "Last Name", "Smith", "Email Address", "john.smith@acme.com". A rule to capture these entities may detect or identify a label and then capture the text after the label. More complicated rules may involve matching patterns using regular expressions or other pattern matching. To capture the action for this activity, the keyword "Update Profile" may be matched exactly. If there are multiple titles, entities may be detected by looking for or identifying a list of specific keywords.

After entities are detected, some entities may be reinforced by looking for or identifying other occurrences of the entities that are otherwise not detected using patterns. For example, in our previous example "John Smith" was detected using a specific pattern. However, the words "John Smith" may appear on other screens in unstructured text such as documents, letters, email bodies or comment fields. After "John Smith" has been found, the system can detect or identify "John Smith" or variations on "John Smith" (e.g., "Smith John", "Smith", "John") in other screens and add these occurrences to the detected entities.

Figure 4:
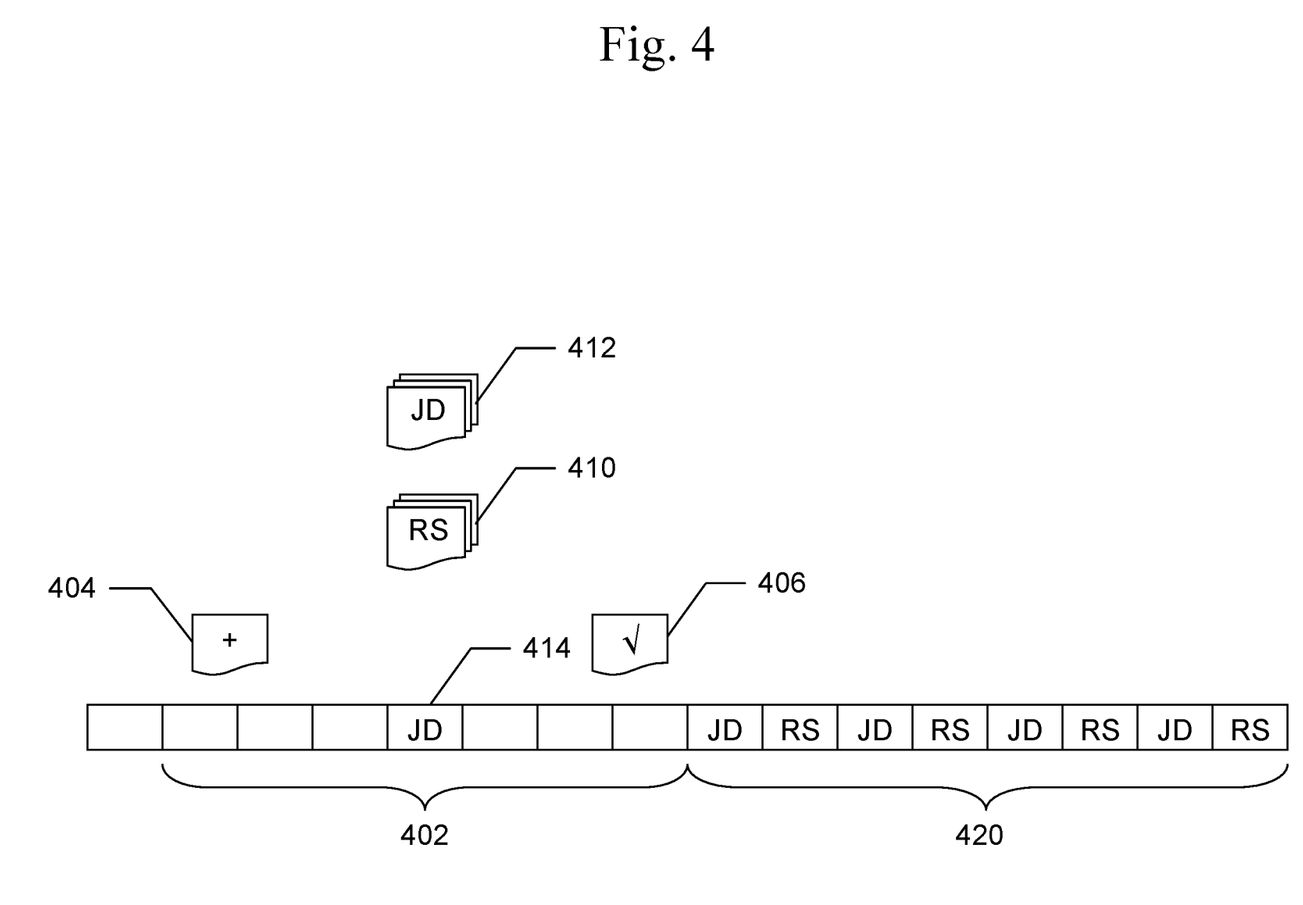
FIG. 4 is an exemplary diagram of detection of entities and actions, in accordance with embodiments of the present invention.

At this point, the system may have stored a series of events that are each annotated with entities and actions, as shown in FIG. 4. Given this, some embodiments of the system determine the overall duration of activity as the delta 402 between the event where an entity first appears 404 and the event where the action on that entity is executed 406. However, doing so may not account for instances where the user multitasks.

With reference to FIG. 1, to account for multitasking, in step 108, an interval may be applied by Usage Determiner 208 to the series of events, creating a set of "time buckets". Each time bucket may contain some or all of the events that occur within that interval. The entity that "wins" or may be considered the owner of each bucket may be selected. In some embodiments, this may be the most common entity in the bucket. For example, if a time bucket contains two events for "Richard Stein" 410 and five events for "James Dupont" 412, in some embodiments the bucket will be annotated as belonging to "James Dupont". In further embodiments, the system may detect or identify a series of time buckets 420 that alternate between different entity and action winners. This may indicate that a user was multitasking by working on two or more different activities simultaneously.

In some embodiments, the content of time buckets that do not contain any entities or actions may, in step 110, be extrapolated from the surrounding buckets when appropriate by applying a set of rules. For example, an action may be "back-filled" to the first time an entity was detected to make activity detection simpler. As another example, activities may also be created using hierarchical clustering. In hierarchical clustering the system may add similar time buckets to an activity in successive iterations until no more similar time buckets can be added. In this case, similarity may be calculated by creating a vector of entities for each time bucket. If one vector is determined to be similar to another vector (e.g., similar over a pre-configured percentage such as fifty percent), the two time buckets may be clustered or combined into an activity. Subsequent iterations may add additional time buckets to the activity if they are also at least fifty percent similar. In further embodiments, empty time buckets may automatically be added if they are bounded by two time buckets with similar entity vectors.

Once all buckets have been filled, in step 112, the duration of an activity may be calculated, for example by multiplying the number of buckets that contain a given entity and action by the duration of the interval. The duration of the activity may only be accurate to the nearest interval.

The techniques described may be further expanded to capture the duration of almost any data that was worked upon. For example, by selecting all time buckets for a customer, an analyst could calculate the overall duration or amount of time spent servicing that customer as an entity regardless of the actions performed. Likewise, if "product" was captured as an entity, the overall amount of time spent servicing a product could be easily calculated.

The techniques described may be further expanded to capture the duration of almost anything given a series of events that contain additional data elements. For example, system data such as logs may be processed using these techniques to understand the amount of time a system spends on entities, methods, or tasks.

Figure 5:
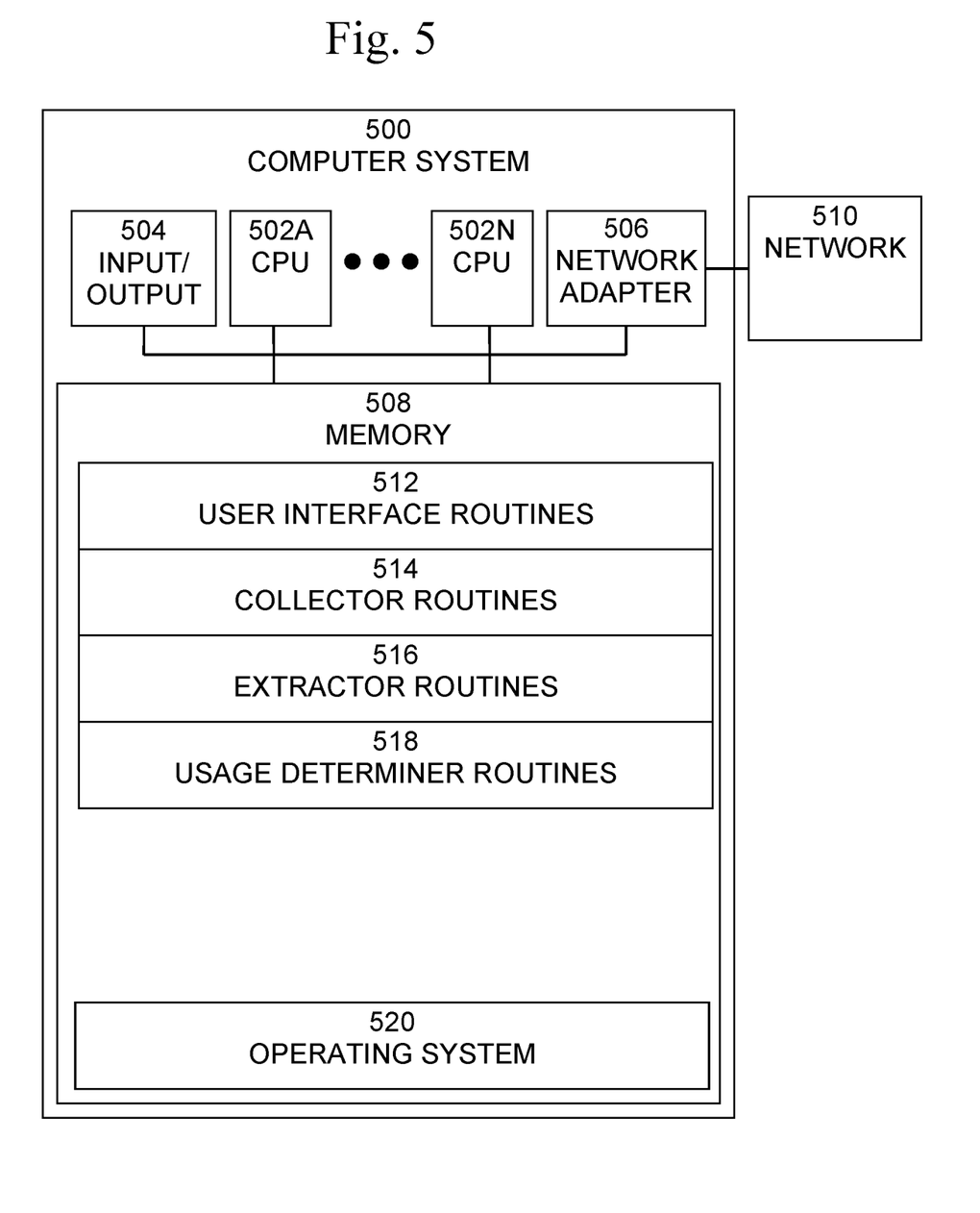
FIG. 5 is an exemplary block diagram of an embodiment of a computer system in which the process shown in FIG. 1 may be performed.

FIG. 5 shows an exemplary block diagram of an embodiment of computer system 500, which may include structural elements shown in FIG. 2 to perform the process shown in FIG. 1. Computer system 500 is typically a programmed general-purpose computer system, such as a personal computer, tablet computer, mobile device, workstation, server system, minicomputer, mainframe computer, etc. Computer system 500 includes one or more processors (CPUs) 502A-502N, input/output circuitry 504, network adapter 506, and memory 508. CPUs 502A-502N execute program instructions in order to carry out the functions of the present UI usage systems and methods. Typically, CPUs 502A-502N are one or more microprocessors, such as an INTEL® CORE processor. FIG. 5 illustrates an embodiment in which computer system 500 is implemented as a single multi-processor computer system, in which multiple processors 502A-502N share system resources, such as memory 508, input/output circuitry 504, and network adapter 506. However, the present UI usage systems and methods may also include embodiments in which computer system 500 is implemented as a plurality of networked computer systems, which may be single-processor computer systems, multi-processor computer systems, or a mix thereof.

Input/output circuitry 504 provides the capability to input data to, or output data from, computer system 500. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces computer system 500 with a network 510. Network 510 may be any public or proprietary LAN or WAN, including, but not limited to the Internet.

Memory 508 stores program instructions that are executed by, and data that are used and processed by, CPU 502 to perform the functions of computer system 500. Memory 508 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 508 vary depending upon the function that verification computer system 500 is programmed to perform. In the example shown in FIG. 5, exemplary memory contents for an analysis system are shown. However, one of skill in the art would recognize that these functions, along with the memory contents related to those functions, may be included on one system, or may be distributed among a plurality of systems, based on well-known engineering considerations. The present UI usage systems and methods may include any and all such arrangements.

In the example shown in FIG. 5, memory 508 may include user interface routines 512, collector routines 514, extractor routines 516, and usage determiner routines 518, and operating system 520. User interface routines 514 may generate a user interface display, which may include data entry fields in the form of text boxes, checkboxes, selection entry lists, etc., and may accept user entry of data into the data entry fields. Collector routines 516 may provide the capability to generate a series of events that may contain both an individual event (such as a click, double-click, text-change, etc.) and the data on the screen at the time of that event and to convert the data on the screen into a text representation. Extractor routines 518 may provide the capability to extract entities and actions from the text representation. Usage determiner routines 518 may provide the capability to apply an interval to a series of events, to create a set of time buckets, back fill time buckets that do not contain any entities or actions, and determine the duration of an activity. Operating system 524 provides overall system functionality.

As shown in FIG. 5, the present UI usage systems and methods may be implemented on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, macOS and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

Although examples of embodiments of the present invention have been described, it will be understood by those of skill in the art that there are other embodiments that are nonetheless within the scope of the present invention. Accordingly, it is to be understood that the invention is not to be limited by the specific described embodiments, but only by the scope of the appended claims.

What is claimed is:

1. A method of determining user interface usage, the method comprising:
 collecting, from at least one user interface including at least one data entry field, data indicating at least one event that occurs as a result of an action performed by a user on a data entry field and data associated with the user interface at the time of the at least one action;
 extracting, from the data indicating at least one event and the data associated with the user interface, data indicating an entity associated with the at least one event;
 applying an interval to the data indicating at least one event, the data associated with the user interface, and the data indicating an entity and determining an entity as owner of the event for that interval;
 determining a duration of an activity based on a number of intervals that contain a given entity and action; and
 determining an entity as owner of an event for an interval that includes at least one of no entities and no actions based on an entity determined as owner of surrounding intervals.

2. The method of claim 1, wherein the collecting comprises:
 converting the data associated with the user interface at the time of the at least one action to a text representation.

3. The method of claim 2, wherein the converting comprises at least one process selected from a group comprising: parsing hypertext markup language (HTML) in a web page, iterating over individual controls in the user interface, iterating over each detected text region in a screen that was captured with optical character recognition (OCR), and iterating over characters within at least one of a mainframe screen and a console screen.

4. The method of claim 3, wherein the converting comprises including text bounded within a logical control and ignoring extraneous information.

5. The method of claim 1, wherein the extracting comprises:
 applying at least one of a plurality of text-processing rules and a plurality of object selection rules to the data indicating at least one event and the data associated with the user interface.

6. The method of claim 5, wherein the text-processing rules comprise at least one rule selected from a group comprising: identifying a label and capturing text after the label, matching patterns using at least one of regular expressions and other pattern matching, matching keywords, and identifying a list of specific keywords.

7. A system for determining user interface usage, the system comprising a processor, memory accessible by the processor, and program instructions and data stored in the memory, the program instructions executable by the processor to perform:
 collecting, from a user interface including at least one data entry field, data indicating at least one event that occurs as a result of an action performed by a user on a data entry field and data associated with the user interface at the time of the at least one action;
 extracting, from the data indicating at least one event and the data associated with the user interface, data indicating an entity associated with the at least one event;
 applying an interval to the data indicating at least one event, the data associated with the user interface, and the data indicating an entity and determining an entity as owner of the event for that interval;
 determining a duration of an activity based on a number of intervals that contain a given entity and action; and
 determining an entity as owner of an event for an interval that includes at least one of no entities and no actions based on an entity determined as owner of surrounding intervals.

8. The system of claim 7, wherein the collecting comprises:
 converting the data associated with the user interface at the time of the at least one action to a text representation.

9. The system of claim 8, wherein the converting comprises at least one process selected from a group comprising: parsing hypertext markup language (HTML) in a web page, iterating over individual controls in the user interface, iterating over each detected text region in a screen that was captured with optical character recognition (OCR), and iterating over characters within a mainframe or console screen.

10. The system of claim 9, wherein the converting comprises including text bounded within a logical control and ignoring extraneous information.

11. The system of claim 7, wherein the extracting comprises:
applying at least one of a plurality of text-processing rules and a plurality of object selection rules to the data indicating at least one event and the data associated with the user interface.

12. The system of claim 11, wherein the text-processing rules comprise at least one rule selected from a group comprising: identifying a label and capturing text after the label, matching patterns using at least one of regular expressions and other pattern matching, matching keywords, and identifying a list of specific keywords.

13. A computer program product for determining user interface usage, the computer program product comprising a non-transitory computer readable medium storing program instructions that when executed by a processor perform:
collecting, from a user interface including at least one data entry field, data indicating at least one event that occurs as a result of an action performed by a user on a data entry field and data associated with the user interface at the time of the at least one action;
extracting, from the data indicating at least one event and the data associated with the user interface, data indicating an entity associated with the at least one event;
applying an interval to the data indicating at least one event, the data associated with the user interface, and the data indicating an entity and determining an entity as owner of the event for that interval;
determining a duration of an activity based on a number of intervals that contain a given entity and action; and
determining an entity as owner of an event for an interval that includes at least one of no entities and no actions based on an entity determined as owner of surrounding intervals.

14. The computer program product of claim 13, wherein the collecting comprises:
converting the data associated with the user interface at the time of the at least one action to a text representation.

15. The computer program product of claim 14, wherein the converting comprises at least one process selected from a group comprising: parsing hypertext markup language (HTML) in a web page, iterating over individual controls in the user interface, iterating over each detected text region in a screen that was captured with optical character recognition (OCR), and iterating over characters within at least one of a mainframe screen and a console screen.

16. The computer program product of claim 15, wherein the converting comprises including text bounded within a logical control and ignoring extraneous information.

17. The computer program product of claim 13, wherein the extracting comprises:
applying at least one of a plurality of text-processing rules and a plurality of object selection rules to the data indicating at least one event and the data associated with the user interface.

* * * * *